(12) United States Patent
Yoon et al.

(10) Patent No.: US 9,454,067 B2
(45) Date of Patent: Sep. 27, 2016

(54) LASER PROJECTOR

(71) Applicant: LG ELECTRONICS INC., Seoul (KR)

(72) Inventors: Chanyoung Yoon, Seoul (KR); Jaewook Kwon, Seoul (KR)

(73) Assignee: LG Electronics Inc., Seoul (KR)

( * ) Notice: Subject to any disclaimer, the term of this patent is extended or adjusted under 35 U.S.C. 154(b) by 409 days.

(21) Appl. No.: 14/059,160

(22) Filed: Oct. 21, 2013

(65) Prior Publication Data

US 2014/0293231 A1    Oct. 2, 2014

(30) Foreign Application Priority Data

Mar. 28, 2013    (KR) .................. 10-2013-0033353

(51) Int. Cl.

| | |
|---|---|
| *G03B 21/14* | (2006.01) |
| *G03B 21/20* | (2006.01) |
| *G06F 3/041* | (2006.01) |
| *H04N 9/31* | (2006.01) |
| *G06F 3/042* | (2006.01) |

(52) U.S. Cl.

CPC ......... *G03B 21/142* (2013.01); *G03B 21/2073* (2013.01); *G06F 3/0416* (2013.01); *G06F 3/0423* (2013.01); *H04N 9/3129* (2013.01)

(58) Field of Classification Search

CPC .. G06F 3/017; G06F 3/03547; G06F 3/0416; G06F 3/0421; G06F 3/0423; G02B 26/12; G03B 21/14; G03B 21/2033; H04N 9/3129; H04N 9/3161; H04N 9/3164
USPC ............ 353/69, 70, 101, 121, 122; 345/156, 345/175, 172, 173; 356/4.01, 5.01, 3.04, 356/3.09

See application file for complete search history.

(56) References Cited

U.S. PATENT DOCUMENTS

| | | | | |
|---|---|---|---|---|
| 6,670,603 | B2 * | 12/2003 | Shimada | G03B 21/00 250/235 |
| 7,525,538 | B2 * | 4/2009 | Bathiche | G02B 5/282 345/175 |
| 8,182,093 | B2 * | 5/2012 | Kurozuka | H04N 9/3129 353/37 |
| 8,430,512 | B2 * | 4/2013 | Smits | G02B 26/101 353/85 |
| 2006/0289760 | A1 | 12/2006 | Batiche | |

(Continued)

FOREIGN PATENT DOCUMENTS

| | | |
|---|---|---|
| CN | 101201549 A | 6/2008 |
| CN | 102893200 A | 1/2013 |

*Primary Examiner* — William C Dowling
(74) *Attorney, Agent, or Firm* — Birch, Stewart, Kolasch & Birch, LLP

(57) ABSTRACT

There are disclosed a laser projector configured to project an image to a back side of a screen and to detect a touch input, comprising a light source configured to irradiate at least one of red, green and blue lights, an infrared light emitting device configured to emit an infrared light to the screen, a light synthesis system configured to synthesize image information comprising color information for each pixel with the light irradiated from the light source so as to emit the synthesized light, a scanner configured to project the synthesized light toward the screen for each pixel, a detector configured to detect an infrared light reflected by an object approaching the screen, and a controller configured to control operations of the light source, the infrared light emitting device and the scanner and to recognize touch input based on the information detected by the detector, such that the laser projector that may perform the projection of the image to the screen and the touch recognition simultaneously may be provided, only to be small-sized.

24 Claims, 16 Drawing Sheets

(56) References Cited

U.S. PATENT DOCUMENTS

| | | | |
|---|---|---|---|
| 2007/0063981 A1* | 3/2007 | Galyean | G06F 3/0421 345/173 |
| 2011/0292321 A1 | 12/2011 | Travis et al. | |
| 2012/0032875 A1* | 2/2012 | Sprowl | G02B 27/01 345/156 |
| 2013/0127717 A1* | 5/2013 | Nagashima | G06F 3/0423 345/158 |
| 2014/0267171 A1* | 9/2014 | Kim | G06F 3/0421 345/175 |
| 2015/0077351 A1* | 3/2015 | Lee | G06F 3/0433 345/173 |
| 2015/0169135 A1* | 6/2015 | Lee | G06F 3/0426 345/175 |

* cited by examiner

LASER PROJECTOR

Pursuant to 35 U.S.C. §119(a), this application claims the benefit of earlier filing date and right of priority to Korean Application No. 10-2013-0033353, filed on Mar. 28, 2013, the contents of which are hereby incorporated by reference herein in their entirety.

BACKGROUND OF THE DISCLOSURE

1. Field of the Disclosure

The present invention relates to a laser projector that senses touch, while realizing an image by using a laser light source and a scanner.

2. Discussion of the Related Art

A projection type image display device (namely, a projector) can realize a large image, with no auxiliary display panel. Such a projection type display device is used in realizing a screen for a conference or meeting and is small-sized as an image display device for children.

A conventional projection type display device (a conventional projector) typically uses a light emitting diode as a light source. Recently, a laser projector emerges that uses a laser as a light source In addition, there are demands for image display devices configured to realize an image on a curved screen as well as a simple flat screen. However, it is difficult to realize a sharp clean image because an image projected on a screen might be out of focus according to a position of the screen.

SUMMARY OF THE DISCLOSURE

To overcome the disadvantages, an object of embodiments herewith is to provide a laser projector that senses touch, while realizing an image by using a laser light source and a scanner.

Additional advantages, objects, and features of the disclosure will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a laser projector configured to project an image to a back side of a screen and to detect a touch input on the screen, the laser projector includes a light source configured to irradiate at least one of red, green and blue lights; an infrared light emitting device configured to emit an infrared light to the screen; a light synthesis system configured to synthesize image information comprising color information for each pixel with the light irradiated from the light source so as to emit the synthesized light; a scanner configured to project the synthesized light toward the screen for each pixel; a detector configured to detect an reflected infrared light reflected by an object approaching the screen; and a controller configured to control operations of the light source, the infrared light emitting device and the scanner and to recognize touch input based on the information detected by the detector.

The infrared light emitted from the infrared light emitting device may be irradiated toward the screen by the scanner, with the synthesized light by the light synthesis system.

The infrared light emitting device may be a laser diode configured to emit an infrared light comprising P-waves or S-waves, and the laser projector may further include a quarter waver plate (QWP) provided between the infrared light emitting device and the scanner.

The scanner may transmit the reflected infrared light.

The laser projector may further include a polarization beam splitter comprising a polarization surface configured to transmit the light emitted from the light synthesis system to the scanner and the reflected infrared light to the detector.

The polarization beam splitter may pass the light emitted from the light synthesis system and transmit the light to the scanner, and reflect the reflected infrared light and transmits the light to the detector.

The polarization beam splitter may reflect the light emitted from the light synthesis system and passe the reflected light to the scanner, and transmit the reflected infrared light and transmit the reflected light to the detector.

The polarization beam splitter may further include an inclined surface configured to reflect a scattered light, which the polarization surface fails to transmit to the scanner among the light emitted from the photosynthetic system, toward the other direction out of the polarization surface.

The laser projector may further include a light absorption part configured to absorb the scattered light, which the polarization surface fails to transmit to the scanner among the lights emitted from the light synthesis system.

The synthesized lights emitted from the light synthesis system and the infrared light emitting device may be p-wave lights and the polarization surface passes only S-wave lights to the detector.

The infrared light emitting device may be a laser diode configured to emit an infrared light comprising P-waves or S-waves, and the infrared light emitting device may include a quarter waver plate (QWP) provided between the polarization beam splitter and the scanner.

The infrared light emitting device may be an infrared light emitting diode or an infrared laser diode configured to emit infrared lights to an entire area of the screen.

The infrared light emitting device may be a laser diode (LD) configured to emit an infrared light comprising P-waves or S-waves, and the infrared light emitting device may include a quarter waver plate (QWP) provided in a light emitting part of the infrared light emitting device.

The laser projector may further include a dichroic mirror arranged in a front side of the detector to pass a visible light and to reflect an infrared light, wherein the infrared light transmitted by the scanner is reflected by the dichroic mirror toward the detector.

The laser projector may further include a pin-hole arranged in a front side of the detector; and a lens configured to concentrate the reflected infrared light on the pin-hole.

The laser projector may further include an infrared light filter provided in a front side of the detector.

The laser projector may further include a lens provided in a front side of the detector.

The laser projector according to claim 1, wherein one scanner is provided, and the scanner may rotate on a first axis to move a direction of light irradiation to a first direction and rotate on a second axis to move a direction light irradiation to a second direction, to project a 2-dimensional image to the screen.

The scanner may be configured to project a 2-dimensional image to the screen and may include a first scanner configured to reflect the light synthesized by the light synthesis system and to rotate on a first axis to move a direction of light reflection to a first direction; and a second scanner configured to reflect the light reflected by the first scanner and to rotate on a second axis to move a direction of light reflection to a second direction.

The screen to which the laser projector projects the image may include a curved surface.

The infrared light emitting device or the light source may have an unevenness formed near a passage of the infrared light or the light.

The controller may recognize a touch input at a point of the screen that the scanner is toward, when the detector detects the infrared light reflected by the object approaching the screen.

The infrared light emitted from the infrared light emitting device is driven at a specific frequency or emitted with a modulated waveform, and The controller may determine that the infrared light detected by the detector is the infrared light reflected by the object approaching the screen, when a frequency and a waveform of the infrared light detected by the detector are corresponding to a frequency and a waveform of the infrared light emitted from the infrared light emitting device.

The controller may filter and extract only the lights with the specific frequency or modulated waveform out of the infrared light wavelengths detected by the detector.

According to at least one of the embodiments mentioned above, the laser projector that may perform the projection of the image to the screen and the touch recognition simultaneously may be provided, such that it may be small-sized.

Furthermore, a clean image may be provided to the screen, even when the screen is curved.

Still further, noise infrared lights may be removed, except the infrared lights reflected by the screen out of the infrared lights detected by the detector. Accordingly, a touch recognition rate may be enhanced.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DESCRIPTION OF SPECIFIC EMBODIMENTS

It will be understood that when an element is referred to as being 'on' or 'under' another element, it can be directly on/under the element, and one or more intervening elements may also be present. When an element is referred to as being 'on' or 'under', 'under the element' as well as 'on the element' can be included based on the element.

Figure 1:
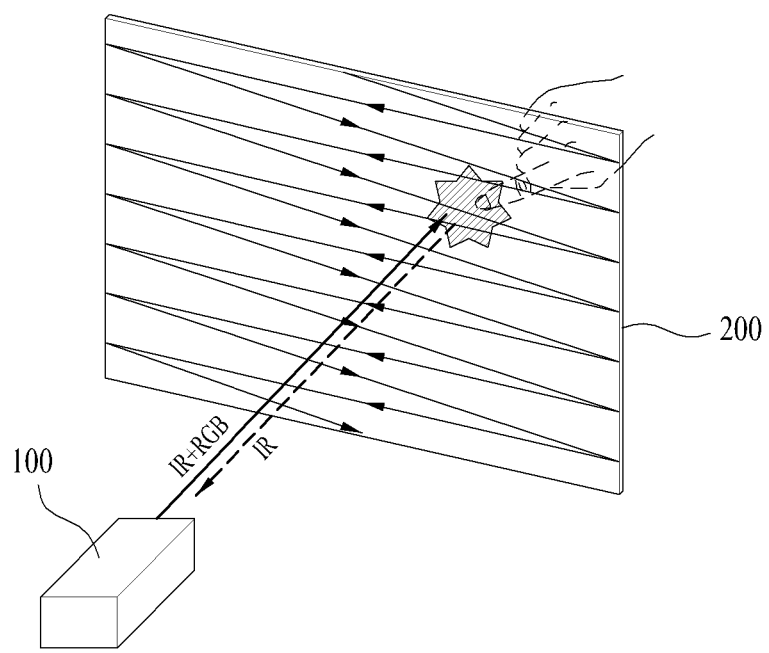
FIG. 1 is a conceptual diagram of a screen display method for a laser projector according to one embodiment of the present invention.
Figure 2:
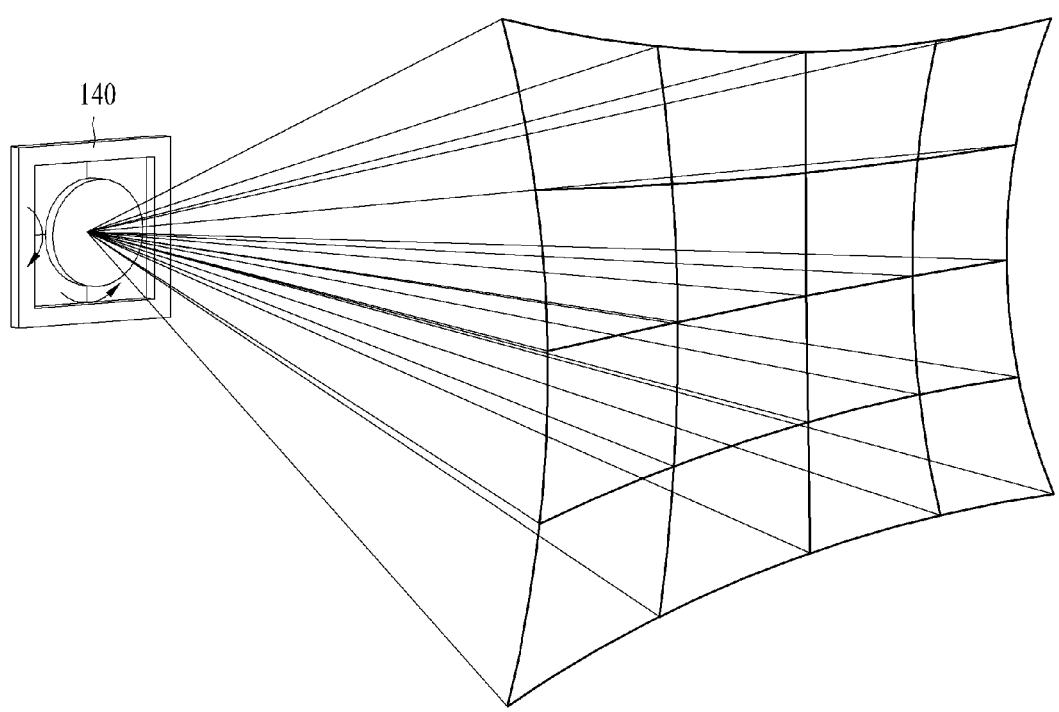
FIG. 2 is a conceptual diagram illustrating an operation of one scanner with two axes.

FIG. 1 is a conceptual diagram of a screen display method for a laser projector 100 according to one embodiment of the present invention. A scanner 140 provided in the laser projector projects an image irradiated from a light synthesis system 130 to a screen 200 and the scanner 140 projects the image to an entire area of the screen 200, moving in zigzag as shown in FIG. 2. At this time, the scanner 140 projects the image corresponding to one pixel to the screen 200 one time.

The time taken for the scanner 140 to irradiate the image to the entire area of the screen 200 is related to the number of motion picture frames. For example, to irradiate 30-framed image to the screen 200, the scanner 140 is moving on the screen 200 once per 1/30 seconds.

The scanner 140 may be classified into one-axis scanner and two-axis scanner based on the number of axes. The one-axis scanner 140 is rotatable only in x-axis or y-axis direction and projects an image only in one direction, only to realize one-dimensional image. The two-axis scanner is rotatable in both x-axis direction and y-axis direction, only to realize two-dimensional image by using only one scanner 140.

FIG. 2 is a conceptual diagram illustrating an operation of one scanner with two axes. The two-axis scanner may realize a two-dimensional image by using only one scanner 140. The two-axis scanner projects the image to the screen 200 in a first direction, while rotating on a first axis. When reaching an end of the screen 200, the two-axis scanner rotates on a second axis and moves to the next pixel in a second direction, and then it projects an image to the screen 200 in the first direction again.

Figure 3:
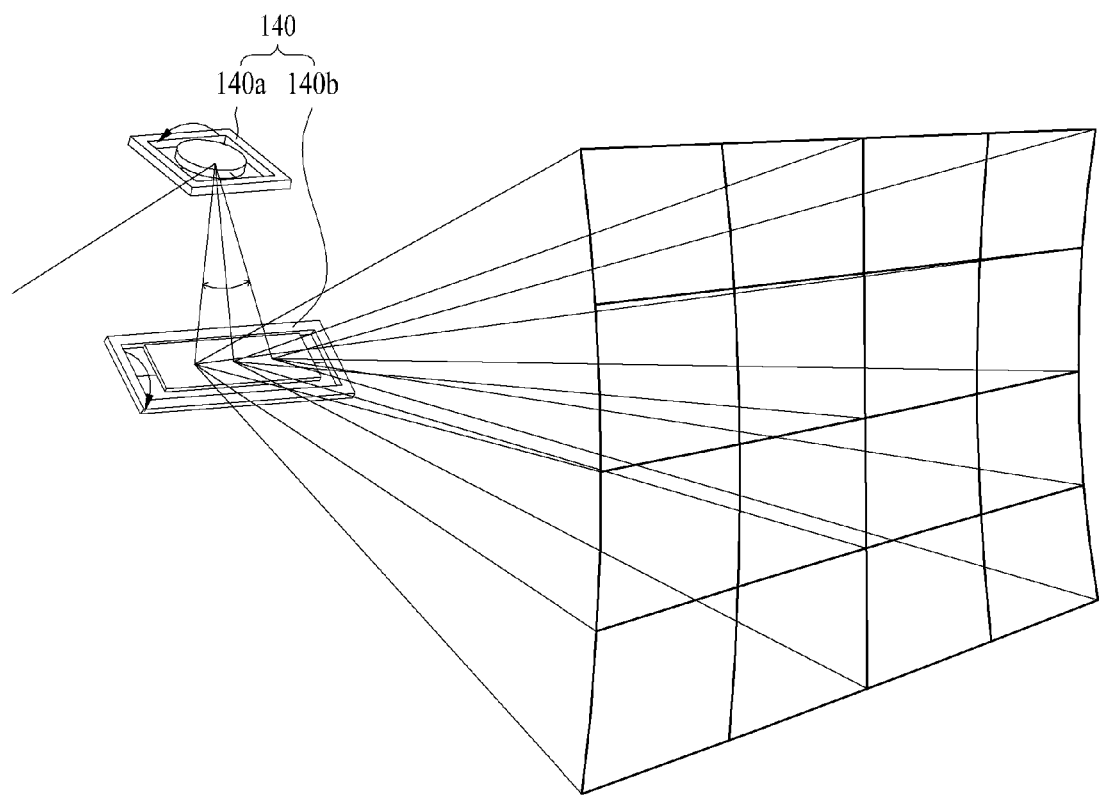
FIG. 3 is a conceptual diagram illustrating an operation of two scanners with one axis.

FIG. 3 is a conceptual diagram illustrating an operation of two scanners with one axis. Two one-axis scanners are required to realize 2-dimensional image. The one-axis scanner includes a first scanner 140a rotatable on a first axis to move a reflection direction of a light toward a first direction, and a second scanner 140b rotatable on a second axis to move a reflection direction of a light to a second direction by reflecting the light reflected via the first scanner 140a to project the reflected light to the screen 200.

At this time, the second scanner 140b is moving in the first direction as the light reflected via the first scanner 140a is moving in the first direction. The first scanner 140a continuously irradiates the light synthesized by the light synthesis system 130 to one point and the position of the light reflected by the first scanner 140a is changed according to the rotation of the first scanner 140a. Accordingly, the second scanner 140b is formed longitudinal in the first direction as shown in FIG. 3.

The first scanner 140a reflects the light toward a top of the second scanner 140b and the reflected light moves from the second scanner 140b in the first direction. The second scanner 140b re-reflects the light reflected by the first scanner 140a to project the light to the screen 200. The position of the light projected on the screen 200 in the first direction is moved by the rotation of the first scanner 140a. When the position of the light reaches the end of the screen 200, the second scanner 140b rotates on the second axis and moves the projecting direction of the light in the second direction as far as one pixel.

The operation is repeated and the image may be projected to the screen in zigzag, such that the two 1-axis scanners 140a and 140b may realize the two-dimensional image.

Figure 4:
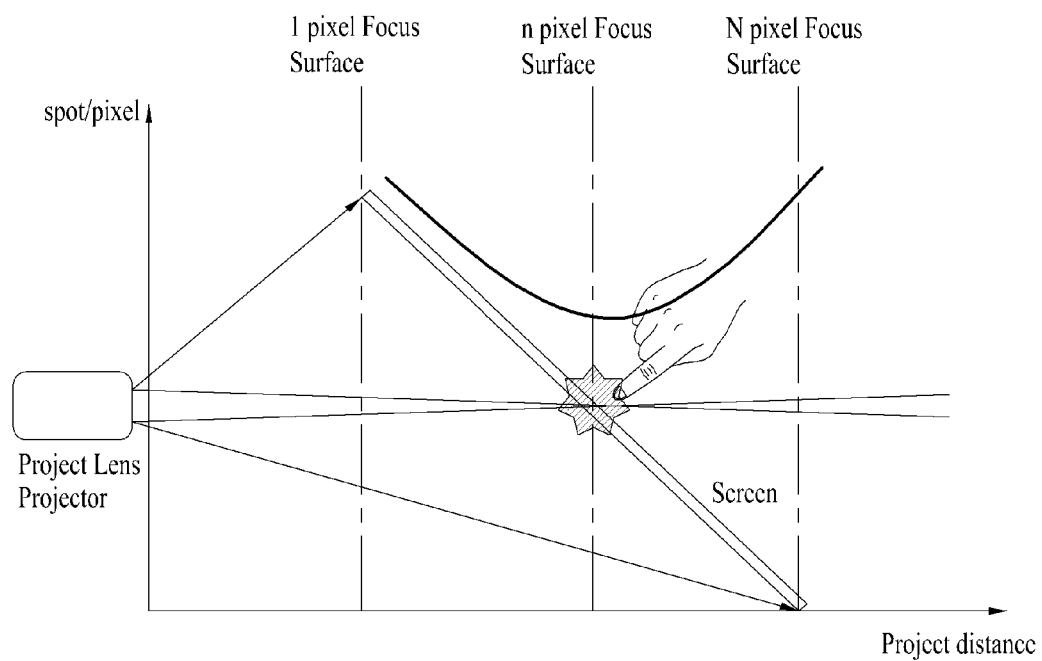
FIG. 4 is a graph illustrating an image imaged on a screen of a injection molding type projector using a project lens.
Figure 5:
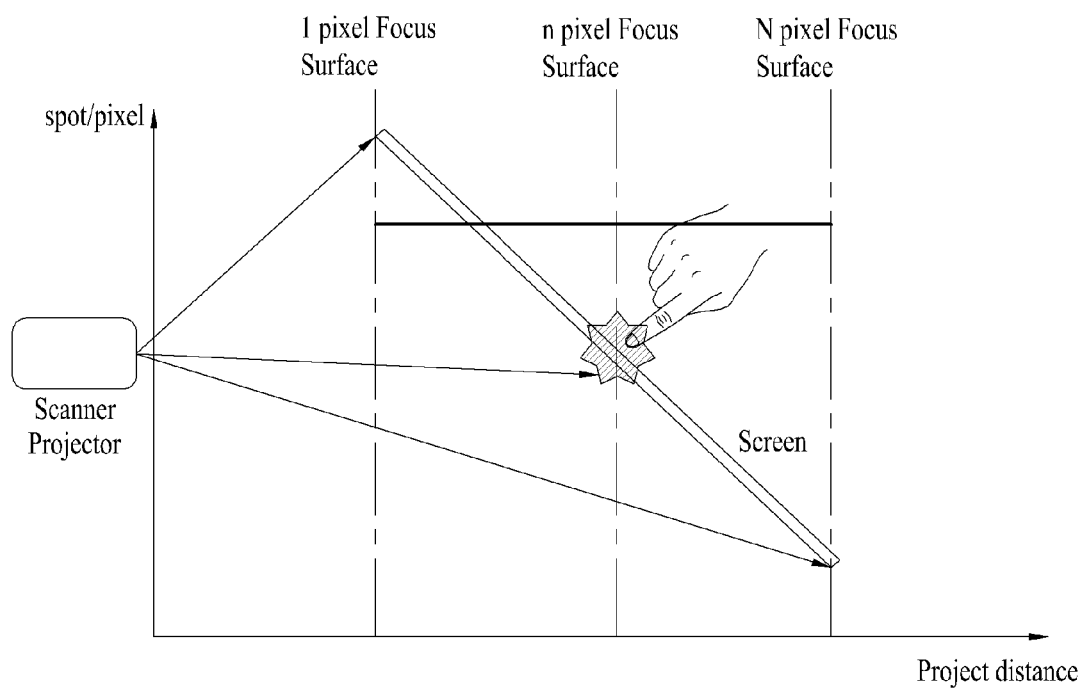
FIG. 5 is a graph illustrating an image imaged on a screen of a injection molding type projector using a scanner.

FIG. 4 is a graph illustrating an image imaged on a screen of an injection molding type projector 200 using a project lens. FIG. 5 is a graph illustrating an image imaged on a screen of an injection molding type projector 200 using a scanner.

In the scanner type using the scanner 140 mentioned above, the scanner 140 configured to reflect lights for pixels, respectively, with no project lens, projects the image on the entire area of the screen, while rotating and moving at a relatively high speed. A digital micro-mirror usually used in a conventional projector device (DMD) projects a light to an overall area of the screen 200 one time. Accordingly, the conventional projector has a disadvantage of an enlarged size in comparison with the size of the scanner 140.

A project lens may be used so as to enlarge the image synthesized in a digital micro-mirror device according to the size of the screen 200. In case using the project lens, the screen 200 has to be positioned in a focus length as shown in FIG. 4 to image a precise image. When n-pixel focus surface is in a focus length in case the screen 200 is tilted as shown in FIG. 4, the size of the image imaged on a substantially closer screen 200 or a less close screen 200 happens to be enlarged enough to realize a blurred image.

However, in case of using the scanner 140, a linear light can be projected to the entire area of the screen 200 while the scanner 140 is moving in zigzag. Accordingly, a clear image may be imaged on the screen 200, regardless of the focus length. As a result, the laser projector including the scanner mentioned above may realize a clean image, regardless of the distant with the screen 200, and it may be applied to a curved screen 200.

The laser projector 100 according to the present invention includes a light source 110, an infrared ray emitting device 120, a light synthesis system 130, a scanner 140, a detector 150 and a controller 180. Various embodiments can be derived according to arrangement of those components composing the laser projector 100.

The light source 110 is a device configured to irradiate at least one of red, green and blue lights. In case three light sources 110 configured to irradiate all of the three colors are provided, all of colors can be realized by RGB color combination. In case only a predetermined number of light sources 110 are provided, an image formed by combination of partial colors may be realized.

The infrared light emitting device 120 is a light source configured to emit an infrared ray. A laser diode (LD) or a light emitting diode (LED) may be used as the infrared light emitting device. According to embodiments, the position of the infrared light emitting device 120 may be changed and the type of the used diode may be differentiated according to the position of the light emitting device.

The light synthesis system 130 synthesizes lights abased on image information including color information for each pixel by controlling the light source 110 and emits the synthesized light. The light emitted by the light synthesis system 130 is projected to the screen 200 by the scanner 140.

As mentioned above, the scanner 140 emits the lights synthesized based on the color information corresponding to one pixel one time and changes the position of the light emission.

The light emitted from the infrared emitting device 120 to the screen 200 is reflected, when an object approaches the screen 200. The detector 150 detects the reflected light and transfers the information on the infrared lights detected to the controller 180.

The controller 180 integrates the information on the infrared lights detected by the detector 150 and on the position of the light on the screen 200 projected by the scanner 140, to recognize touch input. The controller 180 may not only recognize the touch input but also control the light source 110 to synthesize image information and the lights.

Figure 6A:
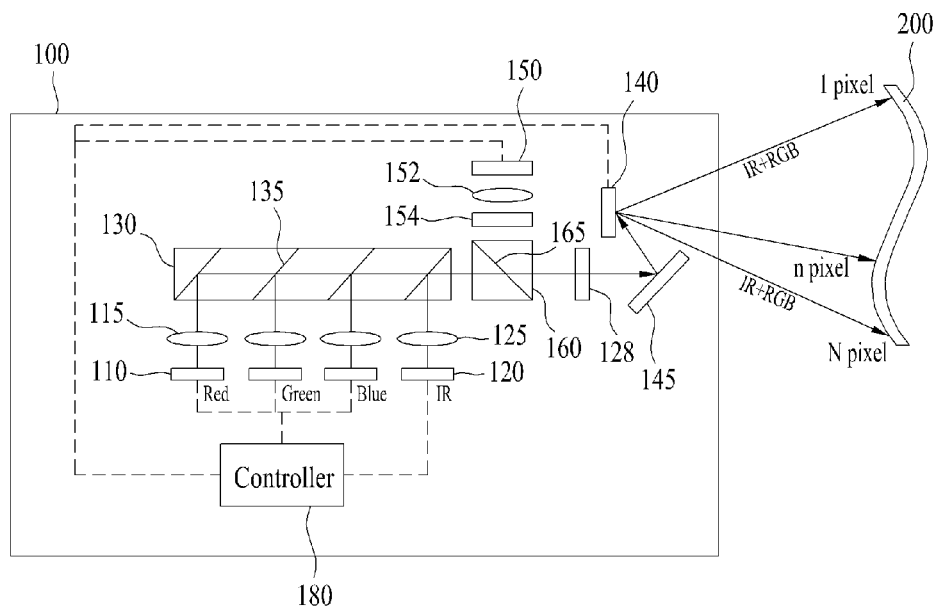
FIGS. 6a and 6b are conceptual diagram of a laser projector according to a first embodiment of the present invention.

FIG. 6a is a conceptual diagram of a laser projector 100 according to a first embodiment of the present invention. This embodiment has a characteristic that image emission, infrared light emission and infrared light detection are performed by the scanner 140.

The screen 200 provided in the laser projector 100 according to the present invention projects an image to a back side of the screen 200. A user may see an image on the opposite side of the screen with respect to the side to which the image is projected and inputs touch, while seeing the screen. The screen 200 may be a three-dimensional model showing topography, a predetermined portion of a case provided in a home appliance and a wall of a building.

The scanner 140 is used and the screen 200 may be applied to a curved screen 200. A clean image is imaged on the screen, regardless of the distance between the scanner 140 and the screen 200, such that the screen 200 using the scanner 140 may realize an image even on a curved surface.

The light source 110 includes at least one of red, green and blue color light sources and it adjusts the light quantity of the light source 110 based on the color information for each pixel included in the image information. The light source 110 may be a laser diode that emits light having linearity and high purity, compared with a light emitting diode.

Such a laser diode may emit the light with a strong linearity and a refined wavelength. Light consists of a P-waveform, an S-waveform, and polarized light elements including a circularly polarized light. A 3-dimensional polarized light waveform is realized by combination of those elements. When using the laser diode, only P-waveform light or S-waveform light can be emitted. In this embodiment, the laser diode may emit P-waveform light for explanation convenience sake.

The light synthesis system 130 synthesizes the light emitted by the light source 110 and emits light corresponding to the color information for each pixel. The light synthesis system 130 may be a dichroic mirror 135 configured to pass a predetermined intensity light emitted by the light source 110 there through and to reflect another predetermined intensity light. The dichroic mirror 135 selectively reflects or pass only light in a specific wavelength band.

In the drawings, a mirror used in reflecting all wavelengths may be used as the mirror configured to reflect the light emitted from a red light source 110. A mirror used in reflecting the light emitted from a green light source 110 has a dichroic characteristic of passing the light emitted from a red light source 110 and reflecting the light emitted from a green light source 110.

The mirror for reflecting the light emitted from a blue light source 110 may be a dichroic mirror 135 configured to pass red and green lights and reflect a blue light. The light synthesized from red, green and blue lights for each pixel may be emitted to the scanner 140.

The light emitted from the infrared ray emitting device 120 has only P-wave or S-wave elements, because the laser diode is used. The reflectivity of such linear polarized infrared light may be differentiated according to the position of the screen 200. Accordingly, in case the size of the screen 200 is too large, there might be a touch input the detector 150 fails to detect even at an end portion of a large screen or a specific point on a screen having a large incidence angle.

A circular polarized infrared light is more advantageous to reflect in the screen than the linear polarized infrared light. Accordingly, a quarter waver plate 128 may be further provided between the infrared light emitting device and the scanner to convert the linear polarized infrared light into a circular polarized infrared light before emitted to the scanner 140 (see FIG. 15).

When a main axis of the quarter waver plate is inclined 45 degrees with respect to a vibration direction of the light emitted from the infrared light emitting device 120, the infrared light passing through the quarter waver plate is converted into a circular polarized infrared light and the circular polarized infrared light is emitted by the scanner 140.

In this embodiment, the infrared light emitting device 120 emits the infrared light to the light synthesis system 130 as well as to the light source 110 and the light synthesis system 130 synthesizes the infrared light, such that the synthesized light may be transmitted to the scanner 140 together to the light from the light source 110. A dichroic mirror 135 arranged in a front side of the infrared light emitting device 120 may be configured to reflect only an infrared light and to pass a visible light. The light synthesized by the synthetic system 130 and the infrared light are emitted to the scanner 140. To emit the lights to the scanner, a mirror may be further provided as shown in the drawings.

Figure 6B:
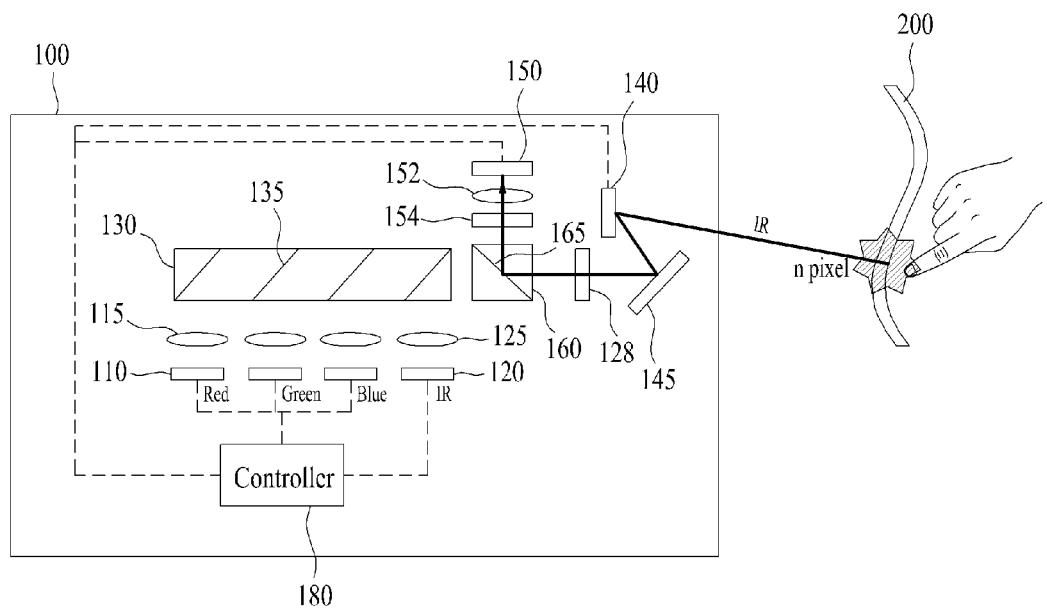

FIG. 6b is a conceptual diagram illustrating a passage of the infrared light detected by the detector after reflected by the screen 200.

As mentioned above, the scanner 140 projects the light corresponding to one pixel one time and moves the position of the projected light in zigzag, only to realize a 2-dimensional image. The projected light has the infrared light. When an object approaches the screen 200, in other words, when a user touches the screen 200, the infrared light is reflected.

The reflected infrared light reflected on the object is reflected by the scanner 140 again and the light reflected by the scanner 140 is transmitted to the detector 150 provided in the laser projector 100. The reflected infrared light moves along the same passage as the passage of the light incident on the scanner 140, such that is may move toward the light synthesis system 130. A polarization beam splitter 160 may be provided to bend the reflected light moving toward the light synthesis system 130.

When using the polarization beam splitter 160, the quarter waver plate 128 is positioned between the polarization beam splitter 160 and the scanner 140 for the infrared light emitted from the infrared light emitting device 120 to pass the quarter waver plate 128 after passing the polarization beam splitter 160. When the light emitted from the infrared light emitting device penetrates the quarter waver plate 128 before the polarization beam splitter, the circular polarized infrared light is supplied to the polarization beam splitter 160 and then noise might be generated.

The polarization beam splitter 160 is a prism having a polarization surface 165. The polarization surface 165 passes P-wave and S-wave from a wavelength of the infrared light and reflects the other one. In this embodiment, the polarization surface 165 provided in the polarization beam splitter 160 passes the P-wave and reflects the S-wave.

Figure 9:
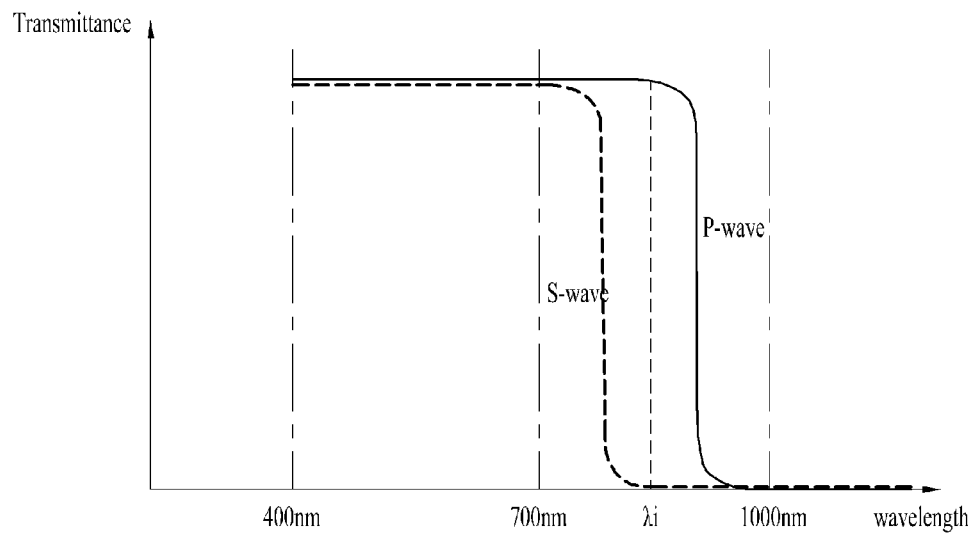
FIG. 9 is a graph illustrating a characteristic possessed by a polarization plane of a polarization beam splitter shown in FIGS. 6a and 6b.

FIG. 9 shows a characteristic of the polarization surface 165 provided in the polarization beam splitter 160 according to this embodiment. The P-wave includes an infrared light wavelength ($\lambda i$) and passes a light in a visible wavelength. However, the S-wave passes a light in a shorter wavelength than the infrared light wavelength ($\lambda i$) and reflects the S-wave of the infrared light, not passing.

In other words, the light emitted from the light synthesis system 130 is the P-wave light emitted from the light source 110, such that it may be transmitted to the scanner 140 after penetrating the polarization beam splitter 160. In contrast, the light reflected on the screen 200 is scattered and the infrared light mixed with P-wave and S-wave lights is incident on the polarization beam splitter 160 by the scanner 140.

The polarization surface 165 of the polarization beam splitter 160 reflects only the S-wave toward the detector 150. The light is scattered and only the infrared light having the S-wave is transmitted to the detector 150. The detector 150 may further include an infrared light filter 154 provided in a front surface thereof. The infrared light filter 154 passes only the infrared light there through and reduces the noise generated by other wavelengths as much as possible.

The light emitted from the light source 110 or the light emitted from the light synthesis system 130 may be partially scattered before being incident on the detector 150. Here, the light incident on the detector 140 by the scanner from outside may include a visible light and the infrared light filter 154 may be used in filtering only the reflected infrared light reflected. In addition, a lens 125 may be further provided in a front side of the detector 150 and such a lens 125 may concentrate the lights, such that the size of the detector 150 may be reduced.

A conventional infrared detecting camera acquires infrared light information for the overall screen 200 simultaneously to detect the position of the screen 200 in an image. In this instance, the conventional infrared detecting camera has to acquire much information one time and to detect the point where a touch input is implemented. Accordingly, the detection accuracy of the infrared detection camera might be deteriorated.

However, the only thing the detector 150 according to the embodiment has to perform is to detect only the infrared reflected on one pixel one time, such that a small sized infrared detector may be used as the detector 150. When detecting the infrared light, the detector 150 may transmit a signal to the controller 180 and the controller 180 may recognize that there is a touch input at the position of the screen 200 with respect to the scanner 140 when the detector 150 detects the infrared light.

Figure 7:
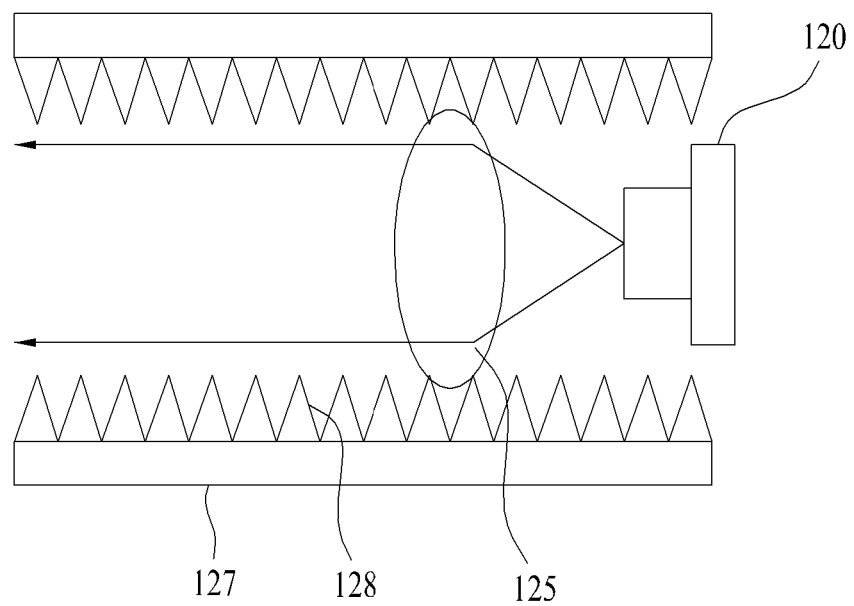
FIG. 7 is a sectional diagram of a light source provided in the laser projector according to the first embodiment of the present invention.

FIG. 7 is a sectional diagram of the infrared emitting device 120 according to one embodiment of the laser projector 100. The infrared lights emitted from the infrared emitting device 120 may be partially collided against a wall surface of a body tube 127. The infrared light scattered while collided against an inner wall of the body tube 127 may include S-wave lights and a direction of the scattering is different from a normal light-emitting direction from the infrared light emitting device 120, such that the scattered S-wave light may be used as a noise signal for the detector 150.

In case the infrared light emitting device 120 and the detector 150 are arranged in the same inner space according to this embodiment, noise could be more severe. To prevent such severe noise, an unevenness 128 may be formed in the inner wall of the body tube 127 such that the scattered light may extinct in the body tube, without being emitted.

The body tube having the unevenness formed therein may be applied to the light source 110. The unevenness is formed in an inner surface of the body tube configured to emit the lights, only to reduce the noise generated by the visible lights emitted along an abnormal passage.

Figure 8A:
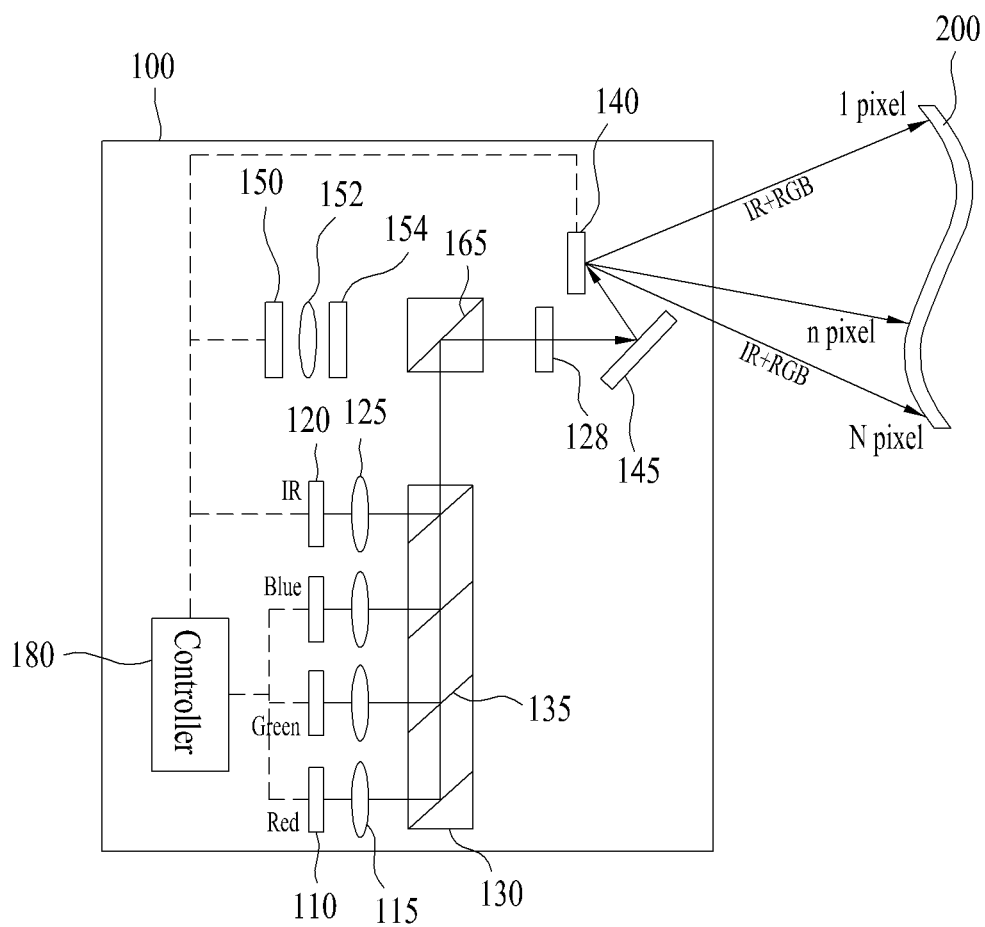
FIGS. 8a and 8b are conceptual diagrams of a laser projector according to a second embodiment of the present invention.
Figure 8B:
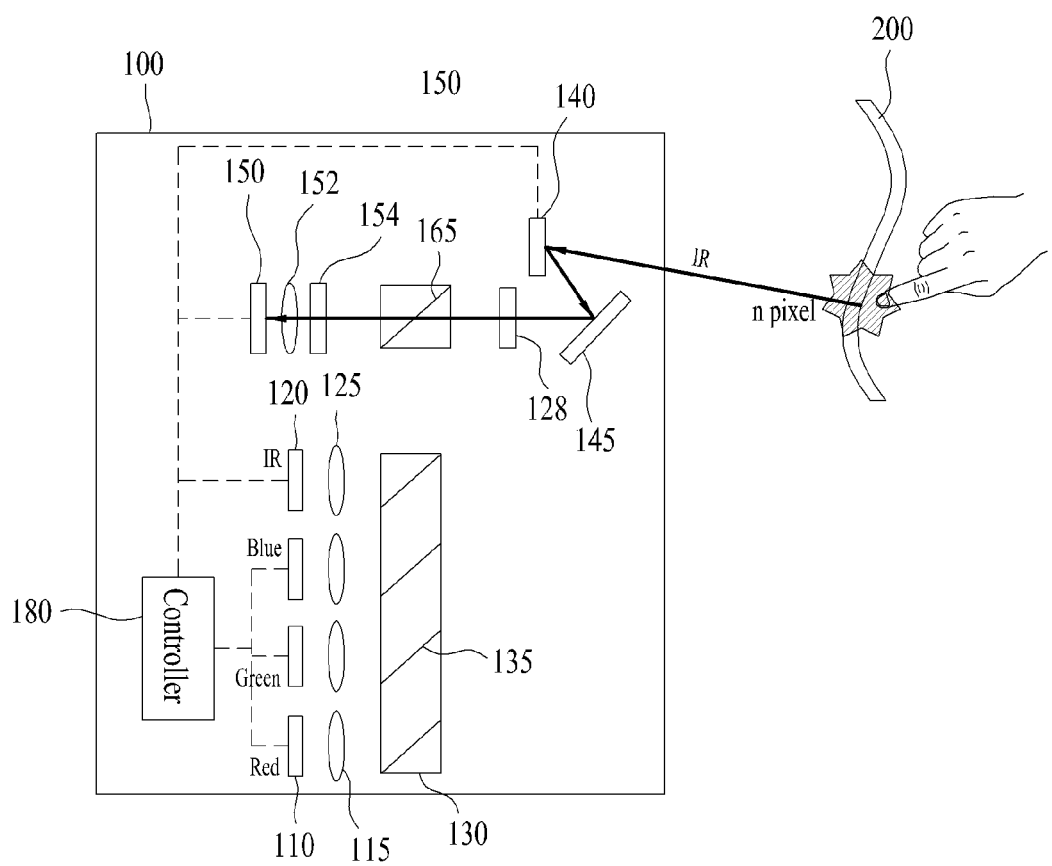

FIGS. 8a and 8b are conceptual diagrams of a laser projector 100 according to a second embodiment of the present invention. In this embodiment, a polarization beam splitter may reflect only a visible light and a transmitted infrared light and include a polarization surface 165 configured to pass the received infrared light, which is different from the embodiment shown in FIGS. 6a and 6b.

Figure 10:
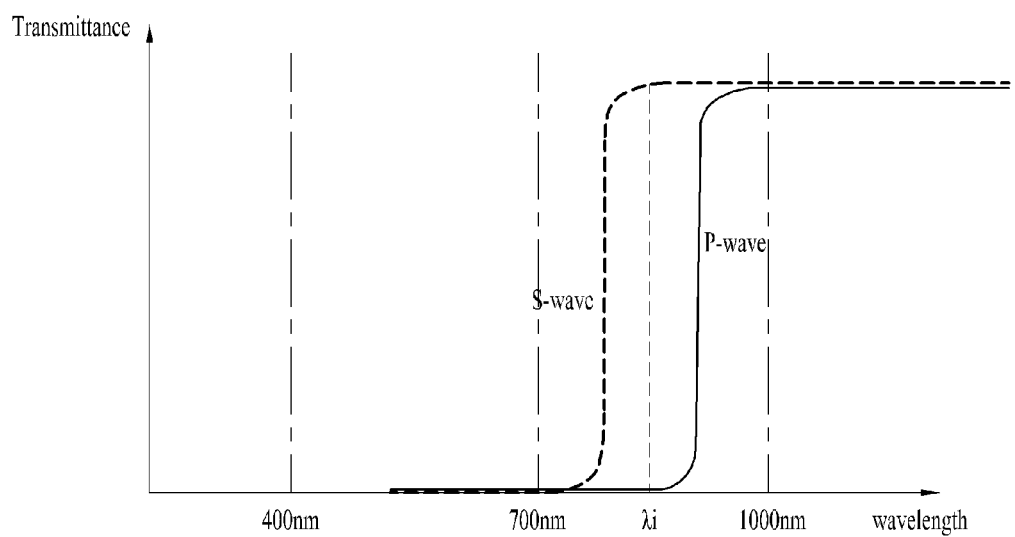
FIG. 10 is a graph illustrating a characteristic possessed by a polarization plane of a polarization beam splitter shown in FIGS. 8a and 8b.

FIG. 10 is a graph illustrating a characteristic of the polarization surface 165 used in this embodiment. The polarization surface 165 passes an S-wave in a longer wavelength than the wavelength of the infrared light and reflects a visible light and an infrared light. In other words, P-wave and S-wave in the visible light wavelength may be reflected. Only P-wave in the infrared light wavelength may pass or S-wave may be reflected.

In this embodiment, the light emitted from the light source 110 and the infrared light emitted from the infrared light emitting device 120 are S-wave infrared lights. As shown in FIG. 8a, the lights are reflected on a polarization surface 165 of a polarization beam splitter 160 and transmitted to the scanner 140. The light emitted from the light synthesis system 130 is reflected on the polarization surface 165 to transmitted to the scanner 140. Accordingly, a direction between the scanner 140 and the light synthesis system 130 is not linear but bent.

As shown in FIG. 8b, the reflected infrared light reflected by an object approaching the screen 200 includes P-waves as well as S-waves as mentioned above, such that only P-waves may penetrate the polarization surface 165 to be passed to the detector 150.

In the first and second embodiments shown in FIGS. 6a and 8a, the passage of the infrared lights emitted from the infrared emitting device 120 is overlapped with the passage of the reflected infrared toward the detector 150. The infrared light emitted from the infrared light emitting device 120 might be drawn into the detector 150. In this instance, the detector 150 might fail to detect the touch input precisely and this problem might be solved by structural change or structural addition.

Figure 11:
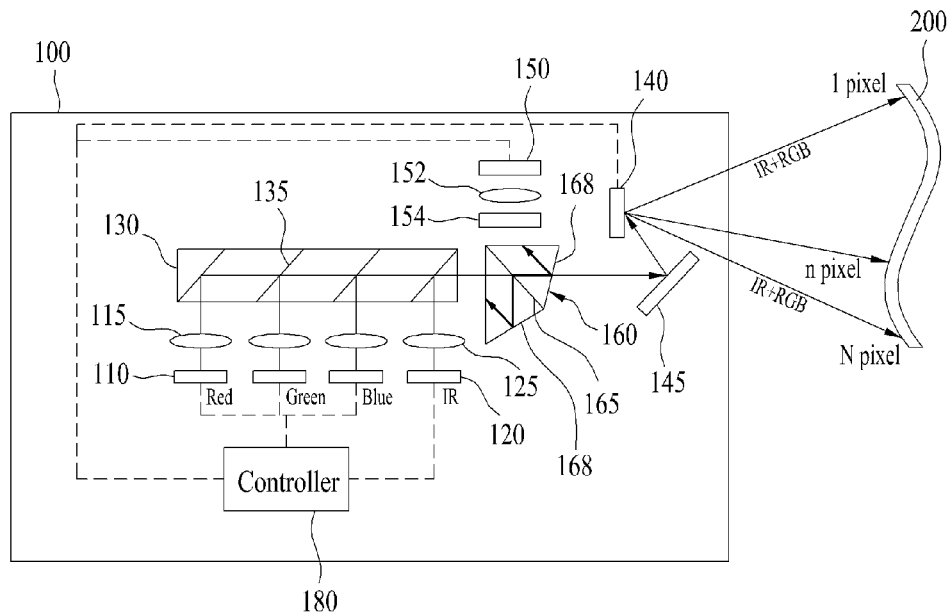
FIG. 11 is a conceptual diagram of a laser projector according to a third embodiment of the present invention.

FIG. 11 is a conceptual diagram of a laser projector 100 according to a third embodiment of the present invention. In this embodiment, there may be provided a beam splitter 160 formed in a different shape from the polarization beam splitter 160 according to the first embodiment shown in FIG. 6a.

All of the infrared lights emitted from the infrared light emitting device 120 fail to be transmitted to the scanner, while penetrating the polarization beam splitter 160, and they may be partially reflected by an outer surface of the polarization beam splitter 160. Like the first embodiment shown in FIG. 6a, an outer surface of the polarization beam splitter 160 having a shape formed by piling up two right-angled-triangles reflects light to make the reflected light re-incident on the polarization surface 165. In this instance, the reflected light might be incident on the detector 150 and the infrared light is detected even in case there is no touch input on the screen 200. Accordingly, a signal might be transmitted to the controller 180 even when no touch input is made.

To solve such a problem, an outer wall surface 168 of the polarization beam splitter 160 may be inclined to make the infrared light reflected inward from the outer wall surface not toward the polarization surface 165. The light reflected by the inclined surface may not be toward the polarization surface 165 and it is difficult to make the light incident on the detector 150, such that noise may be reduced.

Figure 12:
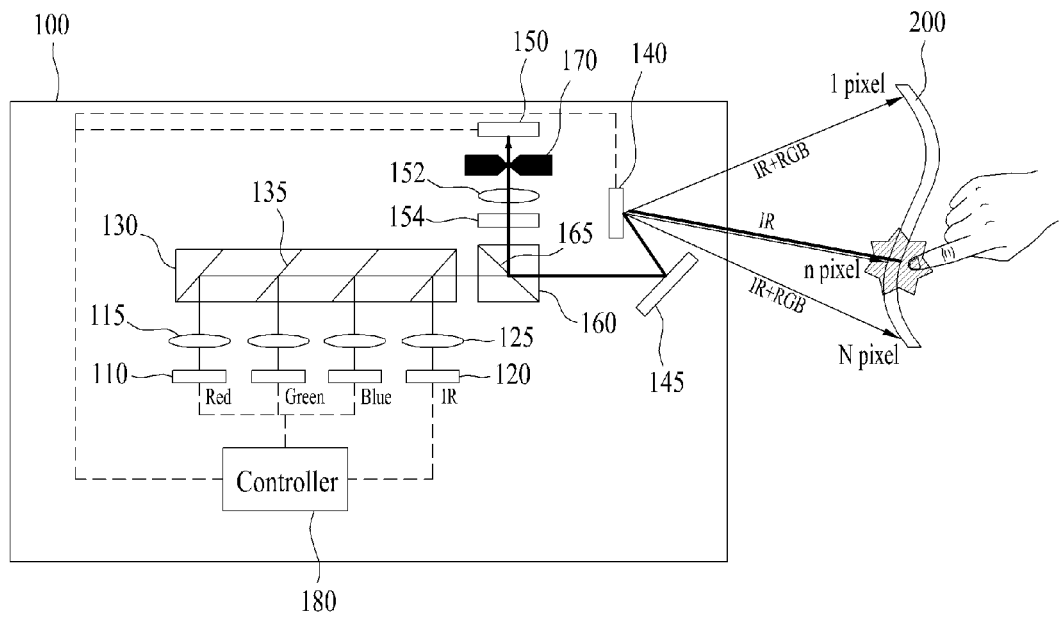
FIG. 12 is a conceptual diagram of a laser projector according to a fourth embodiment of the present invention.

FIG. 12 is a conceptual diagram of a laser projector according to a fourth embodiment of the present invention. In this embodiment, a pin-hole 170 may be provided between the detector 150 and the lens 125. The pin-hole 170 passes only an infrared light drawn in a specific direction and shuts off the light incident after scattered by the infrared light emitting device 120. In other words, the scattered light is incident near the pin-hole 170 and fails to pass through the pin-hole 170 such that it cannot be detected by the detector 150.

The lens 125 may be provided in front of the pin-hole 170 for the light reflected by the screen 200 to pass through the pin-hole 170, such that the light may be incident to the pin-hole 170 after passing through the lens 125. In case a direction of the light incident on the lens 125 is different from a direction of the light reflected by the screen 200, the light may penetrate the lens 125 to be incident on a point near the pin-hole 170. Accordingly, noise of the detector 150 may be reduced.

Figure 13:
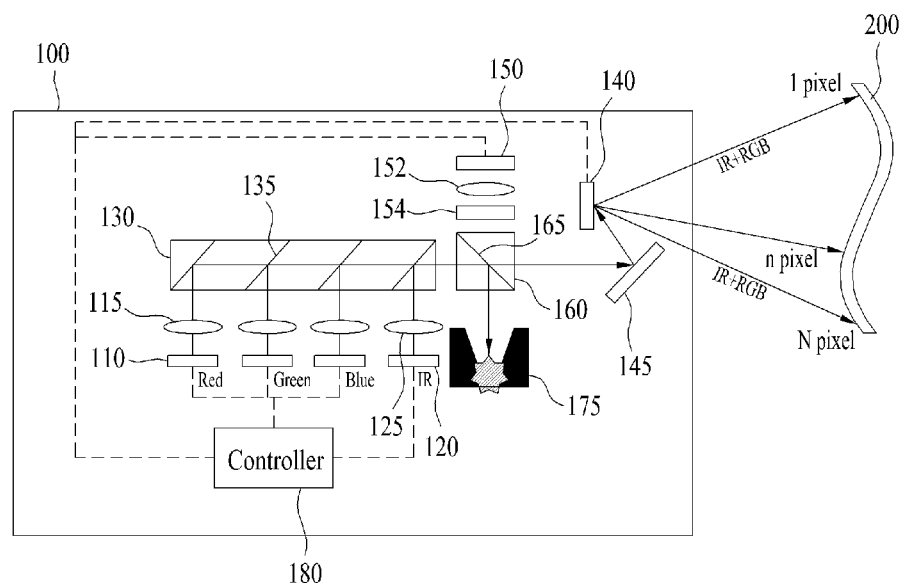
FIG. 13 is a conceptual diagram of a laser projector according to a fifth embodiment of the present invention.

FIG. 13 is a conceptual diagram of a laser projector 100 according to a fifth embodiment of the present invention. In this embodiment, a light absorption part 175 may be further provided. The light absorption part 175 may be configured to absorb the light scattered, not transmitted to the scanner 140, after emitted from the light synthesis system 130.

As shown in the drawing, a dump-shaped member may be provided to make the scattered light reflected therein to extinct, only to prevent the scattered light from being drawn into the detector 150 again. The light absorption part 175 may be provided to face the detector 150 or in a predetermined position where the light emitted from the light synthesis system 130 is scattered.

Figure 14:
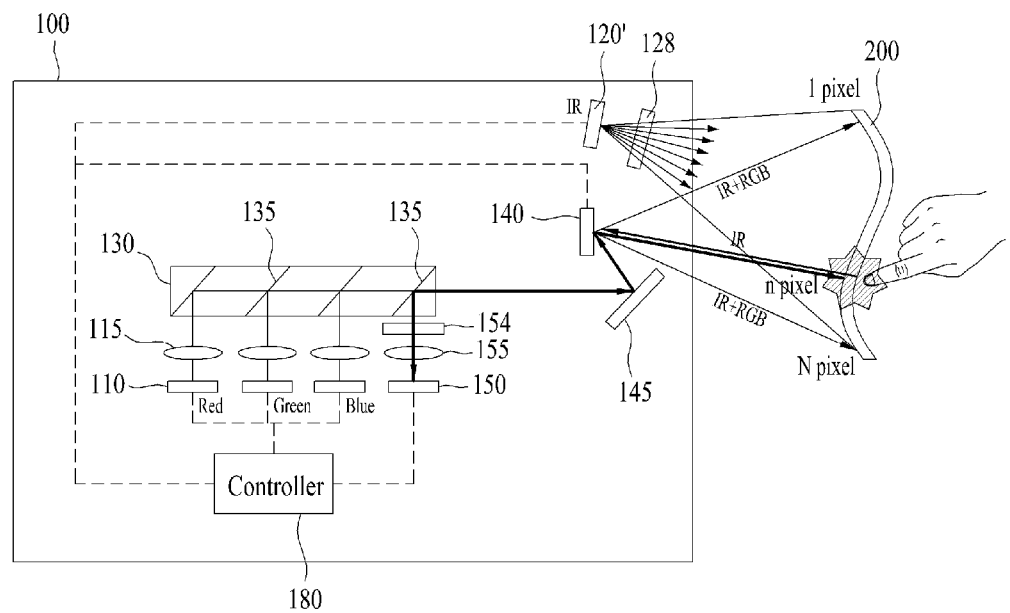
FIG. 14 is a conceptual diagram of a laser projector according to a sixth embodiment of the present invention.

FIG. 14 is a conceptual diagram of a laser projector 100 according to a sixth embodiment of the present invention. In this embodiment, an infrared light may not be emitted to the screen 200 together with the image emitted from the light source and an infrared light emitting device 120' may be provided to emit from an entire area of the screen.

In this instance, infrared lights are emitted to the entire area of the screen 200 and it is not necessary that the infrared light emitting device 120' should be a laser diode (LD). A light emitting diode (LED) can be used as the infrared light emitting device 120' and a plurality of light emitting diodes or laser diodes may be used in emitting infrared lights to the entire area of the screen 200.

In case of using the laser diode, a linear polarized wavelength infrared light is emitted and the linear polarized wavelength infrared light may be converted into a circular polarized infrared light for reflectance efficiency of the infrared lights irradiated to the screen 200 as mentioned in the first embodiment of FIG. 6a. Accordingly, a quarter waver plate 128 may be arranged in a light emitting portion of the infrared light emitting device 120' as shown in FIG. 14, to circularly polarize the linear polarized infrared light and to project the circular polarized infrared light to the screen 200.

In this instance, the infrared lights are irradiated to the entire area of the screen 200. When the user touches the screen 200, the infrared light emitted from the infrared light emitting device 120 may be reflected and the scanner 140 projects the reflected infrared light toward a touched point. After that, the infrared light may be incident on the detector by the scanner 140.

The infrared light drawn to the detector via the scanner 140 moves along a similar passage to a passage of the light emitted from the light synthesis system 130. Accordingly, a dichroic mirror 135 and another dichroic mirror 135 configured to reflect only infrared lights and transmit visible lights may bend the passage of the lights toward the detector 150.

Figure 15:
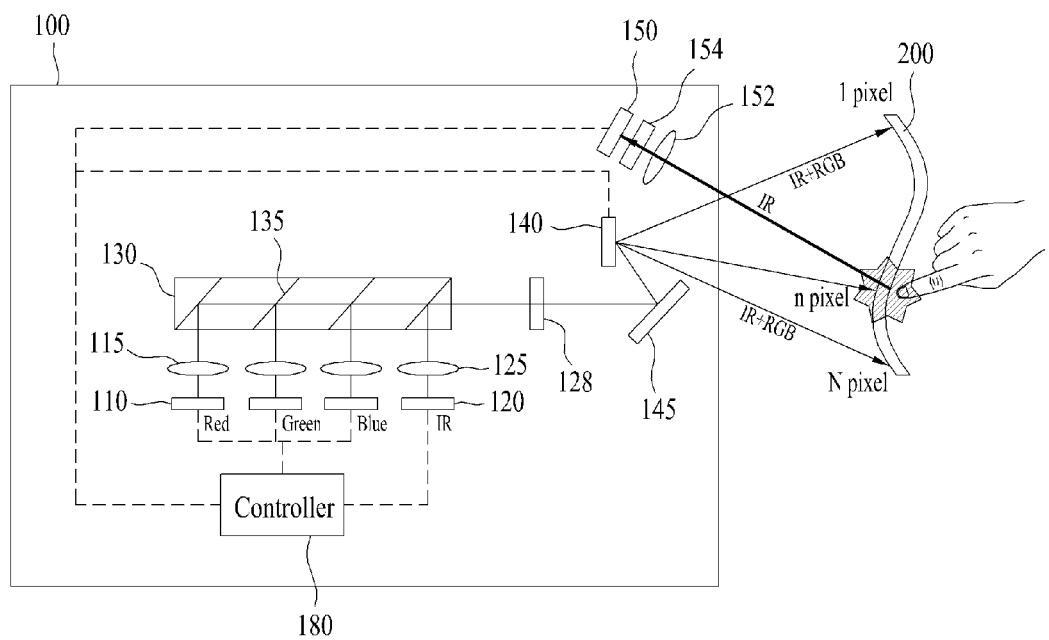
FIG. 15 is a conceptual diagram of a laser projector according to a seventh embodiment of the present invention.

FIG. 15 is a conceptual diagram of a laser projector 100 according to a seventh embodiment of the present invention. In the seventh embodiment shown in FIG. 15, the infrared light incident on the detector 150 may be directly transmitted according to a touch input on the screen, without passing the scanner 140.

This embodiment is similar to the first embodiment shown in FIG. 6a in that the infrared light and the image are emitted via the light synthesis system 130 to be projected to the screen 200 via the scanner 140. When the scanner 140 emits the image and the infrared light toward the touch point of the screen 200 implemented by the user, the detector 150 detects the light reflected by the screen 200.

The controller 180 receives a signal of the infrared light detected by the detector. When the signal is generated, the controller 180 may recognize that there is a touch input at the position of the screen 200 where the scanner 140 emits the infrared light. In this embodiment, the detector 150 need not use any infrared camera configured to photograph infrared light distribution of the overall screen area 200 and the detector 150 only detects whether there is the reflected infrared light. Accordingly, a small-sized infrared light sensor may be used in this embodiment.

Figure 16:
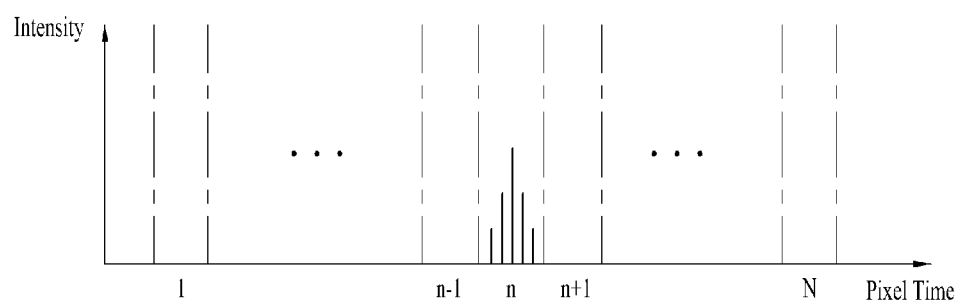
FIG. 16 is a graph illustrating one embodiment of an infrared ray detected by a detector when a touch is inputted to the laser projector.

FIG. 16 is a graph illustrating one embodiment of the infrared light detected by the detector 150 when a touch input is implemented in the laser projector 100. "Pixel time" refers to the time taken for the infrared light emitted from the scanner 140 to move to a pixel position on the screen 200 toward which the scanner 140 emits the image and infrared light. A unit pixel time is the time taken for the infrared light to move from one pixel to the next pixel. When the detector 150 detects the reflected infrared light, the controller 180 may recognize that there is a touch input in the pixel position of the screen 200 to which the scanner 140 emits the light.

Figure 17:
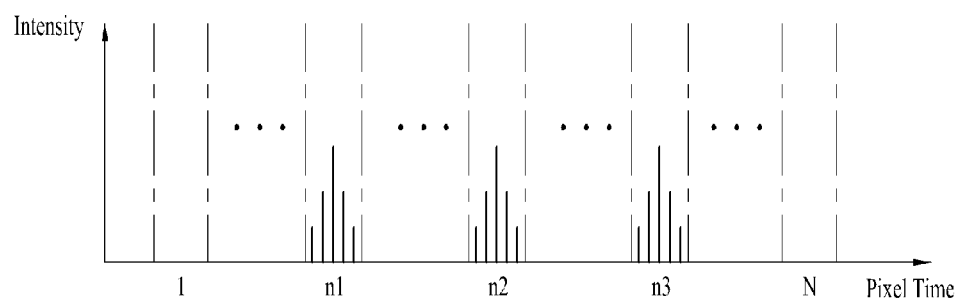
FIG. 17 is a graph illustrating one embodiment of an infrared ray detected by a detector when a multi-touch is inputted to the laser projector.

FIG. 17 is a graph illustrating one embodiment of the infrared light detected by the detector when a multi-touch is inputted to the laser projector 100 according to the present invention. A basic principle shown FIG. 17 is identical to the basic principle shown in FIG. 16. The time taken to move one pixel to the next pixel is shorter than a billionth of a second and the graph shown in FIG. 17 may be gained in case of the multi-touch input.

Figure 18:
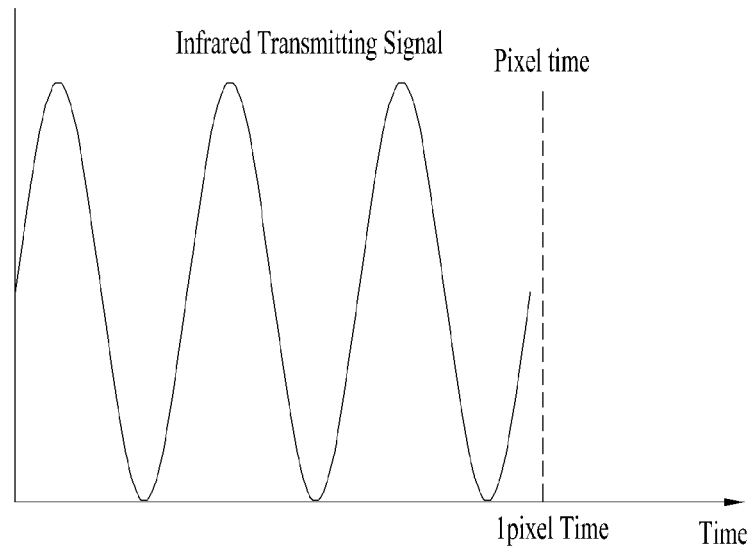
FIG. 18 is a graph illustrating a first embodiment of waveform of an infrared ray emitting device provided in the laser projector according to the present invention.

Here, an external light source 110 may include the infrared light and it could be difficult to distinguish the infrared lights emitted from the infrared light emitting device 120 from the infrared lights drawn from the outside. To distinguish the infrared lights emitted from the infrared light emitting device 120 from the infrared lights drawn from the outside, the infrared light emitting device 120 may emit infrared lights vibrating in a shorter period than the unit pixel time as shown in FIG. 18.

When it is recognized that the infrared light having a corresponding waveform is detected, it may be determined that the reflected infrared is detected by the detector 150. In the other case, the controller 180 may recognize that the infrared light is incident from the outside and it may neglect the corresponding input.

Figure 19:
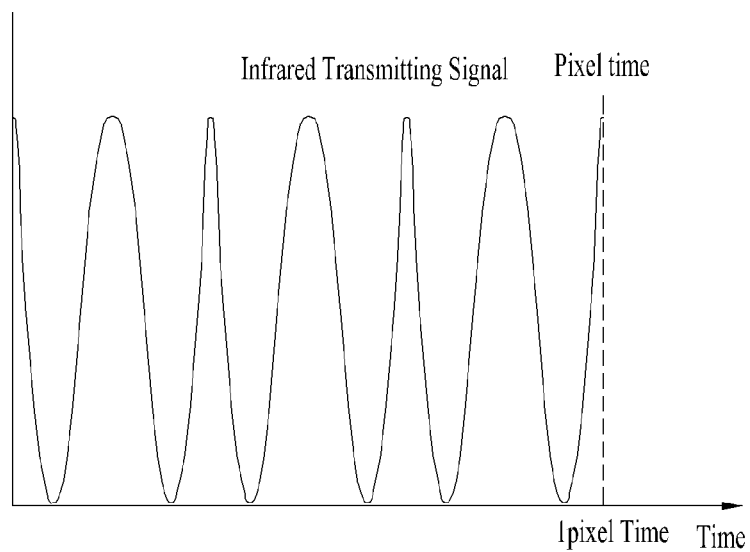
FIG. 19 is a graph illustrating a second embodiment of waveform of an infrared ray emitting device provided in the laser projector according to the present invention.

As shown in FIG. 19, the infrared light emitting device 120 may emit an infrared light having a waveform modulated after synthesized from two or more frequencies. In case recognizing that the other waveform infrared lights are detected except the modulated waveform infrared light as mentioned above, the controller 180 may neglect the signal detected by the detector 150.

Figure 20:
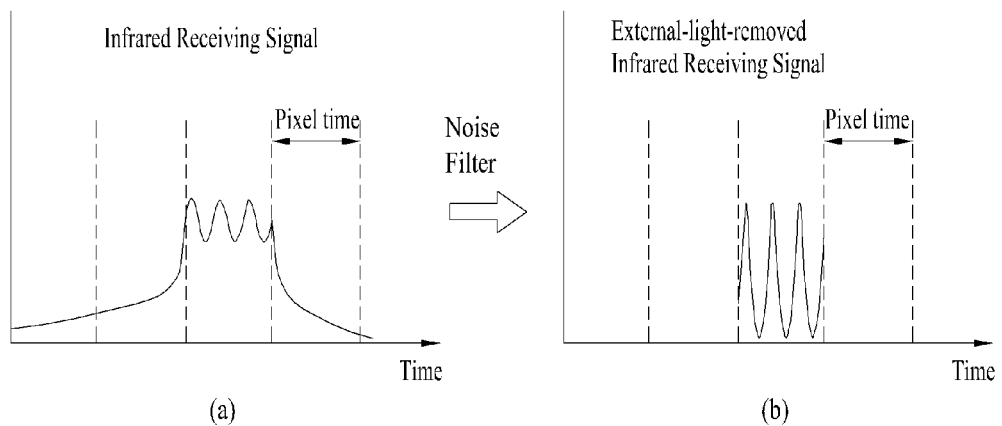
FIG. 20 is a graph illustrating arrangement of waveforms of infrared lights received from a detector according to one embodiment provided in the laser projector.

FIG. 20 is a graph illustrating arrangement of waveforms of the infrared lights received from a detector according to one embodiment provided in the laser projector. The infrared lights detected by the detector 150 may include external lights and continuous values may be gained as shown in FIG. 20 (*a*).

In this instance, the controller 180 needs values corresponding to the waveforms of the lights emitted from the infrared light emitting device 120. The signals detected by the detector 150 are arranged as shown in FIG. 20 (*b*) and only necessary signals remains and the noise generated by the other external lights may be removed.

According to at least one of the embodiments mentioned above, the laser projector 100 that may perform the projection of the image to the screen and the touch recognition simultaneously may be provided, such that it may be small-sized.

Furthermore, a clean image may be provided to the screen, even when the screen is curved.

Still further, noise infrared lights may be removed, except the infrared lights reflected by the screen out of the infrared lights detected by the detector. Accordingly, a touch recognition rate may be enhanced.

When a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A laser projector configured to project an image to a back side of a screen and to detect a touch input on the screen, the laser projector comprising:
   a light source configured to irradiate at least one of red, green and blue lights;
   an infrared light emitting device configured to emit an infrared light to the screen;
   a light synthesis system configured to synthesize image information comprising color information for each pixel with the light irradiated from the light source so as to emit the synthesized light;
   a scanner configured to project the synthesized light toward the screen for each pixel;
   a detector configured to detect a reflected infrared light reflected by an object approaching the screen; and
   a controller configured to control operations of the light source, the infrared light emitting device and the scanner and to recognize touch input based on the reflected infrared light detected by the detector,
   wherein the infrared light emitted from the infrared light emitting device is driven at a specific frequency vibrating in a shorter period than a unit pixel time or emitted with a modulated waveform after synthesized from two or more frequencies, and
   wherein the unit pixel time is a time taken for the infrared light to move from one pixel to the next pixel.

2. The laser projector according to claim 1, wherein the infrared light emitted from the infrared light emitting device is irradiated toward the screen by the scanner, with the synthesized light by the light synthesis system.

3. The laser projector according to claim 2, wherein the infrared light emitting device is a laser diode configured to emit an infrared light comprising P-waves or S-waves, and
   the laser projector further comprises a quarter waver plate (QWP) provided between the infrared light emitting device and the scanner.

4. The laser projector according to claim 1, wherein the scanner transmits the reflected infrared light.

5. The laser projector according to claim 4, further comprising:
   a polarization beam splitter comprising a polarization surface configured to transmit the light emitted from the light synthesis system to the scanner and the reflected infrared light to the detector.

6. The laser projector according to claim 5, wherein the polarization beam splitter passes the light emitted from the light synthesis system and transmit the light to the scanner, and reflects the reflected infrared light and transmits the reflected infrared light to the detector.

7. The laser projector according to claim 5, wherein the polarization beam splitter reflects the light emitted from the light synthesis system to the scanner, and passes the reflected infrared and transmits the reflected light to the detector.

8. The laser projector according to claim 5, wherein the polarization beam splitter further comprises,
   an inclined surface configured to reflect a scattered light, which the polarization surface fails to transmit to the scanner among the light emitted from the light synthesis system, toward the other direction out of the polarization surface.

9. The laser projector according to claim 5, further comprising:
   a light absorption part configured to absorb a scattered light, which the polarization surface fails to transmit to the scanner among the lights emitted from the light synthesis system.

10. The laser projector according to claim 5, wherein the lights emitted from the light synthesis system and the infrared light emitting device are p-wave lights and the polarization surface passes only S-wave lights to the detector.

11. The laser projector according to claim 5, wherein the infrared light emitting device is a laser diode configured to emit an infrared light comprising P-waves or S-waves, and
    the infrared light emitting device comprises a quarter waver plate (QWP) provided between the polarization beam splitter and the scanner.

12. The laser projector according to claim 1, wherein the infrared light emitting device is an infrared light emitting diode or an infrared laser diode configured to emit infrared lights to an entire area of the screen.

13. The laser projector according to claim 12, wherein the infrared light emitting device is a laser diode (LD) configured to emit an infrared light comprising P-waves or S-waves, and
    the infrared light emitting device comprises a quarter waver plate (QWP) provided in a light emitting part of the infrared light emitting device.

14. The laser projector according to claim 12, further comprising:
    a dichroic mirror arranged in a front side of the detector to passes a visible light and to reflect an infrared light,
    wherein the infrared light transmitted by the scanner is reflected by the dichroic mirror toward the detector.

15. The laser projector according to claim 1, further comprising:
    a pin-hole arranged in a front side of the detector; and
    a lens configured to concentrate the reflected infrared light on the pin-hole.

16. The laser projector according to claim 1, further comprising:
    an infrared light filter provided in a front side of the detector.

17. The laser projector according to claim 1, further comprising:
    a lens provided in a front side of the detector.

18. The laser projector according to claim 1, wherein one scanner is provided, and
    the scanner rotates on a first axis to move a direction of light irradiation to a first direction and rotates on a second axis to move a direction light irradiation to a second direction, to project a 2-dimensional image to the screen.

19. The laser projector according to claim 1, wherein the scanner is configured to project a 2-dimensional image to the screen and comprises,
    a first scanner configured to reflect the synthesized light and to rotate on a first axis to move a direction of light reflection to a first direction; and
    a second scanner configured to reflect the light reflected by the first scanner and to rotate on a second axis to move a direction of light reflection to a second direction.

20. The laser projector according to claim 1, wherein the screen to which the laser projector projects the image comprises a curved surface.

21. The laser projector according to claim 1, wherein the infrared light emitting device or the light source has an unevenness formed near a passage of the infrared light or the light.

22. The laser projector according to claim 1, wherein the controller recognizes a touch input at a point of the screen that the scanner is toward, when the detector detects the infrared light reflected by the object approaching the screen.

23. The laser projector according to claim 22, wherein
the controller determines that the infrared light detected by the detector is the infrared light reflected by the object approaching the screen, when a frequency and a waveform of the infrared light detected by the detector are corresponding to a frequency and a waveform of the infrared light emitted from the infrared light emitting device.

24. The laser projector according to claim 23, wherein the controller filters and extracts only the lights with the specific frequency or modulated waveform out of the infrared light wavelengths detected by the detector.

\* \* \* \* \*